United States Patent [19]
Bartholic

[11] Patent Number: 4,985,136
[45] Date of Patent: Jan. 15, 1991

[54] ULTRA-SHORT CONTACT TIME FLUIDIZED CATALYTIC CRACKING PROCESS

[76] Inventor: David B. Bartholic, 75 Wetumpka La., Watchung, N.J. 07060

[21] Appl. No.: 116,910

[22] Filed: Nov. 5, 1987

[51] Int. Cl.$^5$ ............................................. C10G 11/18
[52] U.S. Cl. ..................................... 208/153; 208/113; 208/118; 208/120; 208/154; 208/157; 208/161; 208/163; 208/176; 208/146; 422/139; 422/145; 422/147
[58] Field of Search ................ 208/113, 118, 120, 153, 208/154, 157, 161, 163, 176, 146, 160, 168; 422/145, 147, 139

[56] References Cited

U.S. PATENT DOCUMENTS

| | | | |
|---|---|---|---|
| 2,935,466 | 5/1960 | Schoenmakers | 208/176 |
| 3,074,878 | 1/1963 | Pappas | 208/153 |
| 3,186,805 | 1/1965 | Gomory | 208/153 |
| 3,353,925 | 11/1967 | Bauman et al. | 208/153 |
| 3,959,117 | 5/1976 | Bunn, Jr. et al. | 208/153 |
| 4,263,128 | 4/1981 | Bartholic | 208/93 |
| 4,310,411 | 1/1982 | Wilkening | 208/153 |
| 4,331,533 | 5/1982 | Dean et al. | 208/153 |
| 4,427,537 | 1/1984 | Dean et al. | 208/157 |
| 4,435,272 | 3/1984 | Bartholic et al. | 208/127 |
| 4,435,277 | 3/1984 | Bartholic et al. | 208/167 |
| 4,514,285 | 4/1985 | Niccum et al. | 208/148 |
| 4,606,814 | 8/1986 | Haddad et al. | 208/161 |
| 4,692,235 | 9/1987 | Parker et al. | 208/153 |

FOREIGN PATENT DOCUMENTS

0236055 9/1987 European Pat. Off.

Primary Examiner—Helane E. Myers
Attorney, Agent, or Firm—Finnegan, Henderson, Farabow, Garrett & Dunner

[57] ABSTRACT

A fluid catalytic cracking process wherein a hydrocarbon charge-stock is atomized and injected, in a contactor/reactor, into a vertical curtain of hot regenerated catalyst to vaporize and crack hydrocarbons in the charge-stock, wherein the catalyst preferably contains at least 40% by weight of a zeolitic cracking component and the contact time of the hydrocarbon vapors and the catalyst in the contactor/reactor is ultra-short, preferably not greater than 0.5 second.

18 Claims, 3 Drawing Sheets

ULTRA-SHORT CONTACT TIME FLUIDIZED CATALYTIC CRACKING PROCESS

This invention relates to a process for the convers of a hydrocarbon charge-stock to lower molecular weight liquid hydrocarbon product. More particularly, it relates to a fluidized process for cracking of a liquid hydrocarbon charge-stock to lighter hydrocarbon products using a high activity cracking catalyst lyst which is contacted with the charge-stock for an ultra-short time.

BACKGROUND OF THE INVENTION

It is well known that many heavy fractions of petroleum crudes, such as atmospheric or vacuum resids (the residual oil remaining after fractional distillation of crude oil to remove lighter components) contain coke precursors and metal compounds in amounts which adversely affect further down-stream processing and also, affect the quality of heavy fuels produced therefrom. Similarly, it is known that bitumens obtained from tar sands and heavy oil deposits are difficult and expensive to process because of their high content of asphaltenes and difficult to remove fine particles of inorganic solids.

The above-mentioned coke precursors include polycyclic hydrocarbons, asphaltenes and the like which tend to break down at elevated temperatures to form carbonaceous materials, often referred to as "coke." In subsequent processing coke may form on the interior walls of refining equipment or be deposited on catalyst to reduce its activity level. Hence, a feed stock with a high coke forming tendency is undesirable. The coke forming tendency of an oil is generally evaluated by the Conradson Carbon method or the Ramsbottom Carbon method. A higher number from such an evaluation indicates a greater tendency for coke deposition on, for example, catalyst when the oil is processed by the fluid catalytic cracking (FCC) process wherein heavy charge-stocks, for example, gas oils are cracked to produce gasoline and other lighter products. In the FCC process, coke is burned from the catalyst in a regenerator to restore catalyst activity and the regenerated catalyst is then recycled for the cracking of additional feedstock.

The above-mentioned heavy oil charge-stocks often contain compounds of undesirable metals, including nickel and vanadium, which when deposited on FCC catalyst may adversely affect the physical properties of the catalyst and also promote the undesirable production of coke, hydrogen and other light hydrocarbon gases in the operation of the FCC process.

Similarly, the bitumen from tar sands contains minute, sometimes colloidal, particles of sand which, because of the difficulty of removal, cause processing problems in down-stream processing. Also heavy oil deposits often contain fine particles of solids, such as diatomite, which cause similar problems. Although there are vast deposits of such hydrocarbons, their development has been retarded because of the high cost of obtaining and processing synthetic crudes (syncrudes) from such deposits and problems caused by the high content of solids and asphaltenes.

The oil refining industry has long been plagued with the problem of maximizing high value liquid transportation fuels (e.g., gasoline, jet, and diesel fuels) while minimizing the lower value fuel oil, especially residual oil, which is usually high in sulfur and metals. These heavy fuel oils, which are the heavy end of the crude oil, often require further upgrading to decrease the sulfur and metal contents.

In order to produce the feed-stocks for the units in the refinery, continuous distillation is generally used. This comprises an atomspheric crude unit followed by a vacuum unit. Thus, there are two distillation systems, both containing almost the same equipment of a charge heater, exchangers, and a distillation column. Both systems are required because the heavy atmospheric tower bottoms will thermally crack if a vacuum was not applied to the system to permit the separation to take place at a lower temperature. The refining industry is still trying to find ways to upgrade the vacuum bottoms to lighter, more valuable products, but is limited by the equipment employed. This limit is imposed by the time temperature relationship of the feed heaters. Normally one is limited to about 750 degrees F. on the outlet of the heater. Above this temperature thermal cracking will take place. This thermal cracking results in coking of the heater tubes, overloading of the vacuum ejectors, and "unstable" products.

These processing limitations plus the decreasing availability of lighter crudes, are putting pressure on the petroleum refining industry to find acceptable methods to upgrade the vacuum bottoms, as well as tar sand bitumens and heavy oils. There are many technically feasible processes, but the economics are far from optimum. The hydrogen addition processes require high pressures and large volumes of catalyst, which result in high capital investments, high operating costs, and catalyst disposal problems. The carbon rejection processes are basically less capital intensive, but result in degraded products which need to be further treated, and therefore, increase the capital investment. These carbon rejection processes also produce undesirable by-products such as high sulfur and high metals coke or, if they use a circulating solid, present a large catalyst disposal problem.

Many techniques are known for upgrading such hydrocarbon charge stocks contaminated with the above-described solids and solid-forming contaminants. For example, delayed and fluid coking processes are used. The coking process uses thermal conversion to produce coke and coker gasoline, coker gas oil, etc. The solid coke is usually high in ash and sulfur, and the distillate often must be further treated before it can be used for charging to catalytic cracking or blending. Solvent extraction and deasphalting processes also are used for preparing FCC charge-stocks from resids.

At the present time, the FCC process is considered the "work-horse" of the petroleum refining industry and is used extensively for cracking heavier hydrocarbon charge-stocks to produce lighter, more valuable products, such as gasoline blending stocks. At present, gas oils are the principal charge-stock to the FCC process. The use of residual oils, particularly vacuum resids, as FCC charge-stock is limited due to the high content of asphaltenes and metals. Likewise, the use of FCC charge-stock derived from the tar sand bitumens and heavy oil is also limited for similar reasons.

Historically, the activity of FCC process catalyst has increased from the original sand to the present high activity zeolitic catalysts with zeolite contents of about 25%. Such catalysts are well known in the FCC process art and it is also known that increasing the zeolite content of a catalyst increases its activity for cracking. The use of such zeolitic catalysts has permitted the contact time in the FCC reactor or the FCC riser to be decreased significantly. These changes have allowed the refiner to obtain more throughput, less gas and higher liquid yields.

However, the refiner is coming under increasing pressure to limit the vapor pressure of gasoline, raise the diesel quality, and increase the gasoline octane while converting more and more of the very heavy crude fractions, such as vacuum resids, and the like to higher value products. Therefore, the existing FCC unit's products are becoming a source of concern.

Up to now, it has not been feasible to use zeolitic catalyst with greater than about 30% zeolite content as fresh catalyst addition, because of the reactor design. The typical FCC designs using vertical riser reactors terminating in arms, tees, cyclones or other devices to aid catalyst-oil vapor disengagement require too high a catalyst-oil vapor contact time to effectively use very high zeolitic content cracking catalyst. The typical design contact time is about three seconds in the riser portion of the reactor, which then discharges into a reactor disengaging vessel. Catalyst-oil contact times in this vessel, with superfical velocities of around 3 fps, range from a minimum of 3 to as high as 15 seconds, plus cyclone time. While the catalyst density in this portion of the reactor is usually lower than the catalyst density in the riser portion, the reaction is still proceeding in this location. Much of the reaction is thermal and the overall effect is higher coke levels on spent catalyst, higher gas yields, less liquid yield, poorer quality diesel and bottoms products, and more diolefins. The higher coke levels on spent catalyst results in higher regenerator temperatures, and therefore, lower catalyst to oil ratios.

The current state of the art does not permit a feasible method for achieving short or ultra short contact times in the reactor system. It is typically assumed that the contact times in today's FCC units is 3 seconds or less. However, as discussed above this contemplates only the riser section of the reactor and not the total contact time. Therefore, if a refiner attempts to add significantly more than his normal addition rate of about 1% of the catalyst inventory of 25% zeolite content cracking catalyst as fresh catalyst, he will lose control of his unit. The regenerator temperature will then increase to reduce the catalyst-to-oil ratio, and the reaction will then become more thermal. This will result in more gas and less liquid yield until the regenerator temperature, gas compressor, or gas concentration unit systems are overloaded.

In U.S. Pat. No. 4,263,128, I have disclosed a process for upgrading whole crude and bottoms fractions from distillation of petroleum by high temperature, short time contact with a fluidizable solid of essentially catalytically inert character to deposit high boiling components of the charge stocks on the circulating solid, whereby Conradson Carbon values, salt content and metal content are reduced. Therein, an inert solid, such as particles of kaolin clay, is supplied to a rising column of the charge in a contactor to vaporize most of the charge. Carbonaceous and metallic deposits formed on the particles of circulating solid are burned, after which the solid particles are recycled the contactor.

In U.S. Pat. No. 4,435,272, I have disclosed a process for upgrading such charge-stocks by dispersing the charge introduced into a contactor into a descending curtain of heated particles of an added inert contact material. The charge is vaporized and carbonaceous materials, salt and metals are deposited on the circulating contact material. Deposits on the contact material are then burned off, the heat of combustion is absorbed by the contact material and the heated contact material is recycled to the contactor for vaporizing the charge.

It is also known to spray FCC feed into a riser reactor of a catalytic cracking unit to improve contact between the feed and catalyst.

Such known processes permit increased utilization of the crude (or syncrude) to produce transportation fuels, but they have high capital and operating costs and may create environmental concerns.

Therefore, a primary object of the present invention is a more economic process for producing lower molecular weight, more valuable product, such as liquid transportation fuels, from a higher molecular weight hydrocarbon charge stock contaminated with coke precursors, metal compounds, solids, nitrogen, and the like.

Another object of the present invention is an FCC process permitting the use of very high activity catalyst in an ultra short catalyst-oil contact time system.

A further object is such a process which limits the hydrogen transfer characteristic of the zeolitic catalyst and thereby produces better quality diesel fuel and heavy product (higher hydrogen content), less gas, less secondary cracking and higher catalyst-to-oil ratios due to lower coke formation on the catalyst (lower delta coke).

Yet another object of the invention is an FCC process which permits the use of a zeolitic FCC catalyst with a zeolite content of 40% (by weight) or more of zeolite, and preferably more than 60%, and still more preferably greater than 80%, in order to obtain the conversion necessary for economical operation.

A still further object is such a process allowing higher catalyst-oil contact temperatures which will raise the octane number of the FCC gasoline, while permitting the processing of heavier (higher end point) charge-stocks.

The present invention also permits the processing of multiple hydrocarbon oil charge-stocks, such as atmospheric and vacuum resids, synthetic crudes (syncrudes) from tar sand bitumens and shale oil, thermal virgin naphthas or the like as well as conventional FCC gas oil charge-stocks, to produce more valuable products in a process system which reduces capital and operating costs.

Further, the horizontal contactor reactor used in the process of the present invention allows for actual total contact times of 0.1 to 0.2 seconds in the reaction zone, plus cyclone time, which permits the use of the higher zeolite content fresh catalyst without the negative effects of the current technology. This gives the benefits of the catalytic reactions coupled with control of the thermal reactions in the use of higher reactor temperatures, 1000 to 1100 degrees F., if desired.

Additional objects and advantages of the present invention will be set forth in part in the following description and in part will be obvious from the description, or may be learned by practice of the invention. The objects and advantages of the invention may be realized and obtained by means of the instrumentalites and combination particularly pointed out in the appended claims.

SUMMARY OF THE INVENTION

To achieve the objects and in accordance with the purpose of the present invention, there is provided a novel fluidized process for the conversion of a heavy hydrocarbon oil charge stock to lower molecular weight liquid product. The process comprises atomizing the charge-stock to provide a stream of liquid particles of a preselected size and introducing the atomized charge-stock substantially horizontally into a reaction zone. A stream of hot fluidized cracking catalyst particles is introduced substantially vertically into the reaction zone to intimately contact the atomized charge-stock therein, the temperature, pressure and contact time with the atomized charge-stock being sufficient to vaporize hydrocarbons in said charge-stock and to crack the hydrocarbons to lower molecular weight product. The catalyst contains at least 40% by weight of a zeolitic component having substantial cracking activity. A substantial portion of the hydrocarbon is vaporized to form a mixture of the catalyst particles in the resulting vaporized hydrocarbons and the vaporized hydrocarbons are cracked in the reaction zone. A mixture of vapor containing the resulting cracked product and entrained catalyst particles is passed rapidly into a separation zone and spent catalyst particles are separated from the cracked product. The spent catalyst particles contain deposits of carbonaceous material thereon which reduce the cracking activity of the catalyst, and the spent catalyst particles are passed to a combustion zone where they are contacted with an oxygen-containing gas to burn the carbonaceous deposits and to provide a regenerated catalyst having restored cracking activity and products of combustion, a flue gas. The resulting hot, regenerated catalyst is recycled to the reaction zone to contact fresh atomized charge-stock. The vapors from the reaction zone are passed to a vapor recovery and product fractionation section, and there is recovered a liquid hydrocarbon product having a molecular weight lower than said charge stock.

The charge-stock, advantageously, can be selected from the group consisting of atmospheric and vacuum residual oils, gas oils and tar sand bitumens.

The contact time of the catalyst and hydrocarbons in the reaction zone is preferably not greater than 0.5 second and, more preferably, not greater than about 0.1 to 0.2 second.

In the practice of the process, the flue gas is advantageously mixed with an oxygen containing gas to provide a fluidizing media, the fluidizing media is introduced into the combustion zone near the bottom thereof to fluidize the catalyst particles therein and to oxidize the carbonaceous deposits. The flow rate and oxygen content of the fluidizing media supplied to the combustion zone are controlled in response to a signal representative of the amount of oxygen in the flue gas to obtain the desired amount of burning in the combustion zone.

Advantageously, the combustion zone has an upper section and a lower section, the diameter of the lower section is greater than that of the upper section and the velocity of the fluidizing media and spent catalyst particles in the lower section is less than the velocity thereof in the upper section. This permits a more dense phase system in the lower section and a more fluid, less dense phase in the upper section.

In accordance with the present invention, there is also provided a process wherein multiple charge-stocks, including conventional gas oils and other hydrocarbon charge-stocks which would benefit from separate and distinct severity levels may be processed separately. Such other hydrocarbons may include, for example, vacuum column residual oils; visbreaker, coker or selective vaporization naphthas or other thermal naphthas for octane improvement; virgin naphthas; tar sand bitumen; and shale oil.

DESCRIPTION OF PREFERRED EMBODIMENTS

The catalyst employed in the practice of the present invention should possess a very high activity for cracking under the conditions of the process. Its cracking activity is considerably greater than current high activity FCC catalysts which may contain up to about 25% (by weight) of zeolite. As used herein, the term "zeolite" refers to any of the crystalline materials having substantial activity for cracking which are used as a component of FCC catalyst. Such materials are well known and include the X or Y type crystalline aluminosilicates (which may also be stabilized or subjected to ion exchange with ions of various elements, such as rare earth or hydrogen ions), the "ZSM type" zeolites, or other crystalline silicates containing boron, chromium or the like.

Presently known FCC catalyst testing methods do not suitably measure the activity of the very high activity catalyst employed in the present process. Therefore, there is not available a suitable activity scale for indicating the cracking activity level of such catalyst. However, it is contemplated that such catalyst will contain 40% by weight or more of a zeolitic component having substantial activity for cracking under the conditions of the process, preferably at least 60% by weight of such a cracking component, and, more preferably at least 80% by weight of such a cracking component. The zeolitic cracking component typically will be contained in a matrix of an inorganic oxide, such as alumina, silica or silica-alumina, which may, if desired, also have cracking activity. The catalyst may also have other components added, e.g., for CO, $SO_x$, or $NO_x$ control, or it may be in conjunction with one or more additives for such purposes.

It is desirable that the catalyst possess the desired attrition resistance and stability when used in the process. The particle size of the catalyst should be such that it can be fluidized and circulated in the system, and a particle size typical of current FCC catalyst can be used.

A single charge-stock, or if desired, multiple charge-stocks, are charged to the system for conversion to more valuable product having a molecular weight lower than the charge-stock. The charge-stock may contain large quantities of coke precursors such as asphaltenes, metals, and nitrogen, but other more conventional charge-stocks, such as gas oils, may also be fed to the system.

The FCC process of the present invention is very applicable to processing heavy oil containing large quantities of asphaltenes, metals, and nitrogen, not only because of the anticoking system described hereinbelow, but also because of the method of feed catalyst contact which will also be described. As the quantity of heavy oil (basically above 1000 degree F.) and basic nitrogen material increases in conventional FCC gas oil feedstocks, the active site density, or stated another way, the active sites per unit of feedstock, in the reactor system decreases because the asphaltenes block the active sites of the catalyst, with instantaneous coke formation; and the basic nitrogen compounds neutralize the acid sites, resulting in loss of conversion. The present processing system will reduce these adverse effects, since as the feed is injected into the falling catalyst, the catalyst particles contacting the asphaltene portion of the feed will tend to fall out into the stripper heater, thereby allowing the high zeolitic catalyst to contact the higher hydrogen content portion of the feed and to convert it. The basic nitrogen will still neutralize the acid sites of the catalyst, but because of the increased zeolite content and the increased catalyst circulation rate resulting from the shorter contact time and less secondary coke forming reactions, the effect will be much less severe. Also, the short contact time will reduce the effect of the metal's reactions resulting in less gas and hydrogen production. These short contact times will also produce less thermal reactions allowing for higher temperature contactor operation (greater than 1000 degree F.) with less diolefin production.

Reference will now be made in detail to the present preferred embodiments of the invention, examples of which are illustrated in the accompanying drawings.

For the purpose of illustration, the process system of the present invention will be described using a heavy hydrocarbon oil with asphaltenes and metals contamination as the charge-stock. This in no way is meant to limit the type of charge-stock which may be fed to the process, as it is applicable to operation with all types of hydrocarbon charge-stocks where high activity (more than 40% zeolite) cracking catalyst is used and ultra-low contact times are desired.

Figure 1:
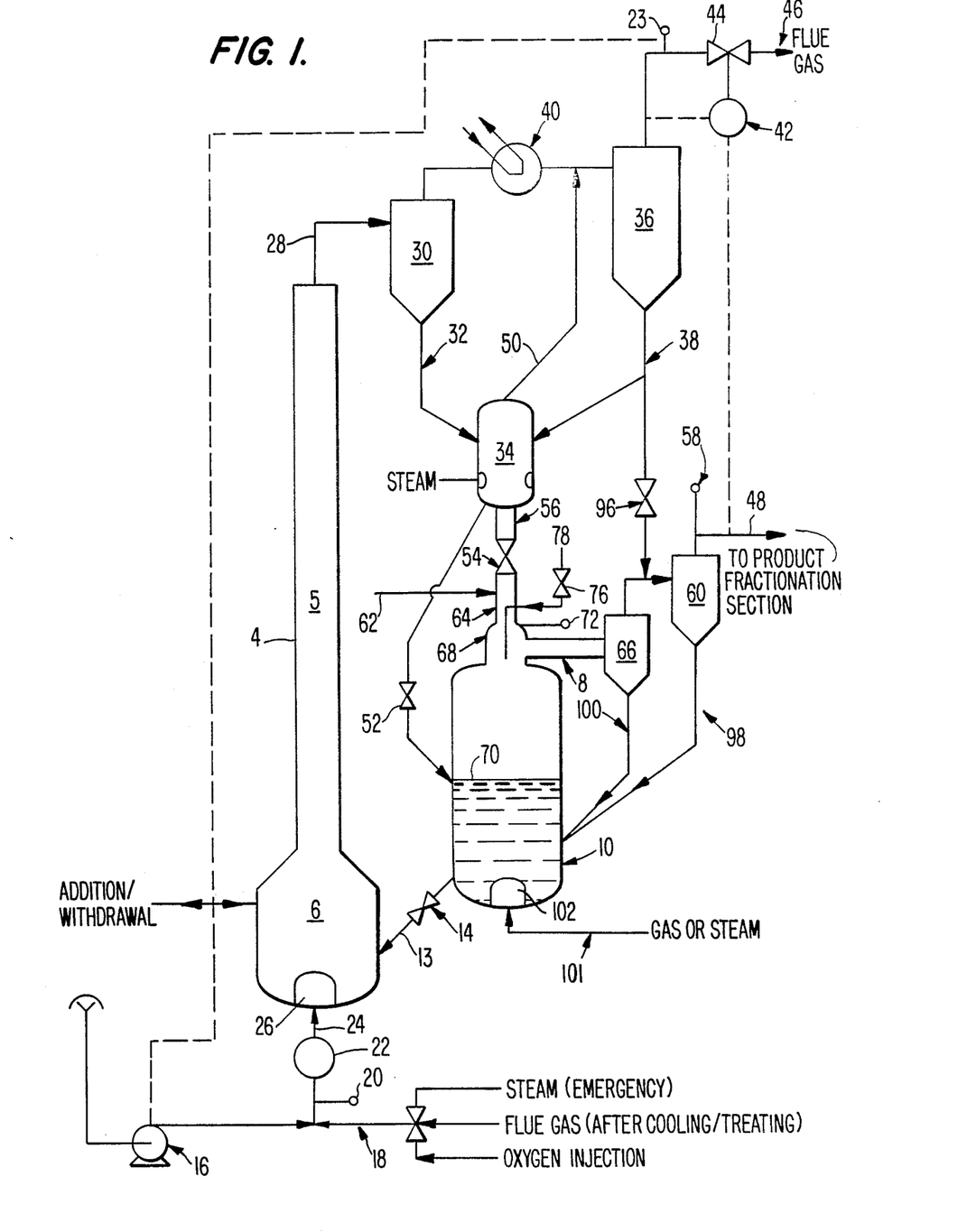
FIG. 1 is a schematic diagram illustrating a preferred system for the practice of the present FCC process of the invention.
Figure 2:
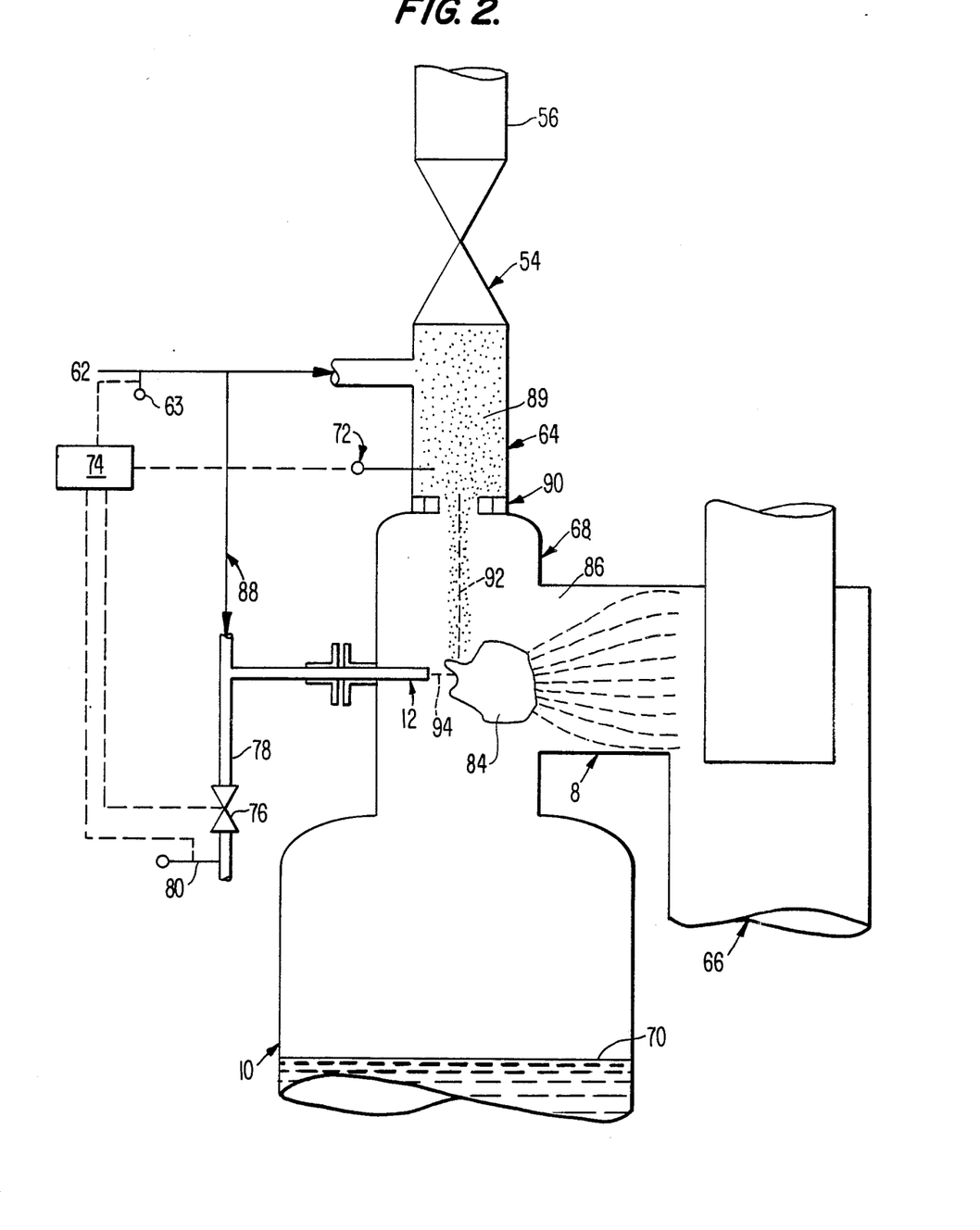
FIG. 2 is an enlarged partial view of the system of FIG. 1 showing in greater detail the operation of the horizontal contactor used in the practice of the present invention.

As shown in FIGS. 1 and 2, the process system consists of a spent catalyst regenerator 4, horizontal contactor 8, a stripper heater 10, a charge-stock atomizer means 12, and associated contactor cyclones 60 and 66, regenerator cyclones 30 and 36, piping, valves, and other equipment as described below. The atomizer means 12 is for forming the charge stock into fine liquid particles which are introduced into a reaction zone, which includes a "top hat" portion 68 of the stripper-heater vessel 10 and a horizontal contactor 8 to contact cracking catalyst vaporization and cracking to lower molecular weight product. Spent or deactivated catalyst is separated from cracked product vapors in contactor cyclones 66 and 60 and passed to stripper-heater 10 where entrained hydrocarbons are stripped from the spent catalyst by steam and heat. Some catalyst particles drop from the top hat 68 into stripper-heater 10 below. Stripped spent catalyst is passed from stripper-heater 10 to the bottom portion 6 of regenerator 4, fluidized and passed upwardly in regenerator 4, and carbonaceous material is burned from the spent catalyst therein to restore its catalytic activity. Regenerated catalyst and combustion products are separated in regenerator cyclones 30 and 36 from which regenerated catalyst and flue gas are removed. Regenerated catalyst is returned to the system as described below and a portion of the flue gas is used as a fluidizing media in the system.

Spent reheated catalyst exits the bottom portion of stripper-heater 10 through a spent catalyst standpipe 13 and slide valve 14, on level control, of the stripper-heater 10 and enters the lower portion 6 of the regenerator 4, where it is contacted with a fluidizing media. The fluidizing media comprises air from air blower 16 and recycled flue gas or oxygen enrichment gas, or both, from line 18 which are mixed and pass through total flow controller 20 and startup air heater 22 into the bottom portion 6 of the regenerator. This fluidizing media is the source of oxygen for burning the carbon from the spent catalyst in the regenerator. In order to control the oxygen at the proper amount to obtain the desired amount of carbon burning in the regenerator while maintaining the desired superficial velocity for this completely fluidized regeneration system, flue gas is recycled on total flow control while the air blower, or oxygen enrichment gas, flow rate is set in response to a signal from a sensor 23 which measures the excess oxygen content in the flue gas. This is a unique feature of the present process.

In order to minimize the effect of vanadium poisoning on catalyst activity, the proper operation is to keep the vanadium in the reduced state (+3) rather than the +5 state so that the vanadium is not mobile and therefore cannot attack the zeolite. Also, while it is desirable to maintain the nickel in an oxidized form to reduce the dehydrogenation function of this and other metals deposited on the circulating catalyst, the ultra-short contact time reactor system (horizontal contactor 8) is employed to accomplish this passivation. It is more important to reduce the oxidation in the regenerator 4, as happens in the conventional two stage FCC regenerator system with the oxygen soak second stage, since this will increase the catalyst to oil ratio by reducing or eliminating the oxygen carryover into the reactor system from the regenerator. This oxygen is associated with the oxidizable materials that make up the circulating catalyst. The oxygen is released in the reactor system as these materials are reduced therein. This burning releases heat which reduces the catalyst circulation rate and accounts for an excess of oxygen compounds in the reactor products. For this reason, it is preferred to operate with less than 0.1 weight percent carbon on regenerated catalyst, and more preferably with less than 0.05 weight percent carbon on regenerated catalyst. The oxygen content of the flue gas should be less than 1.0% by volume, and preferably, at less than 0.5% by volume, and more preferably still, less than 0.1% by volume on high metals charge-stocks in order to minimize the requirement for fresh catalyst makeup.

Another benefit of the present system is the ability to regenerate the catalyst in a single stage system rather than the various two stage systems now employed for heavy feedstocks. The reason the present process can use a single stage system is that there is used a co-current oxygen and catalyst system rather than the back mix systems employed in the two stage systems. In this co-current system the catalyst is protected from hydrothermal deactivation and high oxidation states by employing a completely fluidized regenerator with a plug flow type of design where the carbon level on the catalyst protects it until it reaches the top of regenerator 4 where it becomes essentially clean. A conventional backmix system may have as much as 20 minutes catalyst time versus an estimated 5 seconds or less without carbon protection in the system of the present invention. This results in significantly less hydrothermal deactivation in the present system Regenerator 4 is shown as having a larger diameter bottom portion 6 and a smaller diameter upper portion 5. This design permits a lower velocity, more dense phase system in the bottom portion 6 followed by a higher velocity, more fluid system in upper portion 5 where time and temperature for catalyst regeneration can be traded for height and hydraulics.

A purpose of the increased diameter lower portion 6 is to trade time for length of the regenerator. The typical design conditions for the regenerator would be less than 20 seconds gas time with a preferred time of 10 seconds or less at temperatures greater than 1400° F. The higher the temperature, the less the time required, so the increased time in the lower combustor may at times be unnecessary. In this case, the upper portion 5 of the regenerator 4 and the lower portion 6 would be the same diameter.

Because this embodiment of the present invention employs a completely fluidized regenerator, it is critical to maintain the velocity in the regenerator 4 within certain ranges. If the velocity is too low the particles will not be fluidized and the system will stop circulating. If the velocity is too high there will not be enough time to burn the carbonaceous material from the catalyst. Therefore, this system is distinctive in that it recycles flue gas, after cooling, and air through line 18, heater 22 and line 24 into the bottom portion 6 of the regenerator through the distributor 26 to fluidize the particulates entering through slide valve 14 in line 13 from the stripper-heater 10. The flue gas can be replaced or is normally supplemented with air from air blower 16 to obtain the necessary oxygen for combustion. The air blower 16 flow rate is controlled by the desired flue gas composition and the total air plus flue gas flow rate is controlled by flow controller 20.

The total gas rate to the regenerator 4 is controlled to give a velocity in the upper portion 5 of the regenerator of less than 30 fps and normally about 10 fps, but always above the transport velocity of the catalyst particles. The fluidized spend catalyst particles, along with the combustion products, continue up the higher velocity upper portion 5 of regenerator 4 where the catalyst continues to be regenerated and pass thru line 28 to primary cyclone 30 where 90% or more of the particles are separated from the flue gas. The separated particles exit cyclone 30 through dipleg 32 to the lower portion of dipleg degassing vessel 34, which can be used to strip with steam or gas as much of the flue gas as possible from the hot particulates to minimize the flue gas carried over to the horizontal contactor section 8. Both primary cyclone 30 and secondary cyclone 36 diplegs 32 and 38 discharge below the particulate level in vessel 34.

The flue gas exits primary cyclone 30 and enters optional secondary cyclone 36 precooler 40 to lower the temperature to that desired for mechanical reasons on secondary cyclone 36 or for process reasons, such as to minimize afterburning in those cases where one wants to maintain carbon on regenerated catalyst with incomplete combustion of carbon monoxide. After exiting precooler 40 the flue gas combines with vapors from dipleg degassing vessel 34 before entering secondary cyclone 36 where all the particles greater than 10 microns are removed from the flue gas. The flue gas exits secondary cyclone 36 through the pressure differential control slide valve into flue gas line 46. The pressure on the combustor system is controlled by differential pressure controller 42, connected to flue gas line 46 and to vapor recovery line 48, which adjusts the opening in slide valve 44 to regulate the rate of flue gases exiting the system through line 46. Controller 42 regulates the pressure differential between the regenerator and the horizontal contactor section 8 in order to stabilize the particulate circulation. The flue gas can go to treating, to a power recovery system or to the atmosphere, as desired, and known in the art. After cooling and before reducing the pressure, a slip stream of flue gas can be recycled back through a booster compressor to the bottom portion of regenerator 6 through line 18 and total flow controller 20.

The catalyst separated in cyclones 30 and 36 enters dipleg degassing vessel 34 from diplegs 32 and 38. The degassing vessel can be operated as a stripper with steam, if the hydrothermal deactivation is not significant or as a stripper with hydrocarbon dry gas from the downstream gas concentration system, in order to reduce the amount of inerts entrained into the reactor system. In this latter case, the vent line 50 from degassing vessel 34 would enter the regenerator 4 in order to burn the gas in the presence of catalyst.

The precooler 40 is another unique feature of this process system. In the preferred arrangement cyclone 36 is not a conventional cold wall cyclone with minimum metal internals exposed to the high temperatures as is primary cyclone 30, but it is a high efficiency cyclone system made up of multiclones, as in the Euripos third stage cyclone described in U.S. Pat. No. 4,348,215, which may have a temperature limit of less than 1600° F. This in many cases is less than the operating temperature contemplated for this process. Therefore, cooling of this stream is provided to protect the multiclones. The preferred method of cooling is a heat exchanger, usually used to produce steam to lower the flue gas temperature to the 1400° F.-1600° F. range. This exchanger could be replaced with a liquid or steam quench, but this would normally cause problems because of dew point in downstream equipment.

After degassing, the hot regenerated catalyst enters stripper-heater 10 through hot recirculating slide valve 52 at a preferred rate of 1 to 1 on regenerated catalyst entering the horizontal contactor section 8 through slide valve 54, and more preferably at a rate of 2 to 1 or more. This regenerated catalyst is introduced into the stripper-heater 10 and has multiple purposes. First, it is used to increase the temperature of the spent carbon covered catalyst so that it can be regenerated in the short time fast fluidized regenerator 4. Secondly, by adding this hot regenerated catalyst to the top of the particulate level of stripper-heater 10 it aids the condensation reactions of the asphaltene covered catalyst and reduces the hydrogen carried over into the regenerator. Thirdly, it increases the temperature of the stripping vapors to eliminate the possibility of coking of the contactor system. Fourthly, it increases the stripper-heater temperature which increases the stripping efficiency for the same quantity of stripping media. Also, it increases the gas volume of the gas associated with the pore volume of the catalyst, and thereby, reduces the amount of hydrocarbon gas in the catalyst pores, which results in less hydrogen entrainment into the regenerator 4. This results in a lower regenerator temperature with resulting higher catalyst circulation rates.

The hot regenerated catalyst that is to contact the feed exits from degasser 34 through vertical standpipe 56 and regenerated catalyst slide valve 54, to which is connected temperature controller 58 on the outlet of contactor secondary cyclone 60. Slide valve 54 controls the flow rate of the regenerated catalyst into the premix downcomer 64 to maintain the desired temperature on temperature controller 58.

Downstream of slide valve 54 the regenerated catalyst is mixed with fluidizing/propelling media supplied through line 62, which is hydrocarbon gas recycled from the first stage of the gas compressor on the main column overhead receiver or product gas from the product fractionation section (not shown) to which are passed contactor vapors through line 48. The rate of gas used in this system is critical and is used as a unique feature of the present process to control the time for reaction in the contactor/reaction section 8. The system is preferably designed for 0.1 second of contact time in horizontal contactor/reactor 8 and for full flow of the regenerated catalyst from slide valve 54 through horizontal contactor 8 and into primary cyclone 66. This will require a superficial velocity in the feed injection area, stripper-heater 10 top hat 68, of less than 40 feet per second (fps), so that the regenerated catalyst entering the feed injection area will be able to make the 90 degrees turn at the feed injection point required to enter horizontal contactor 8, and therefore, minimize the contact time. As the velocity in top hat area 68 is raised above 40 fps the catalyst path is increased and therefore the contact time is increased. This in effect is a method of controlling the contact time. The upper limit on velocity is around 100 fps, as this is the point where a significant amount of the regenerated catalyst will not enter the horizontal contactor 8. It is also the velocity where one might cause a significant turbulence in the stripper-heater catalyst bed level 70, resulting in entrainment of hot regenerated catalyst from slide valve 52 into contactor 8. At times of low catalyst activity, low zeolite content, this entrainment might be desirable and even practiced. However, that is not the normal case.

The present preferred process system would also be equipped with an anticoking system. This system uses a temperature override device which is a unique feature of the control system. It comprises a temperature sensing element 72 and a flow measurement device 63 positioned in the fluidizing/propelling media line 62 which are connected to a computer 74 which is also connected to an operator on feed valve 76. The flow rate of the charge stock in conduit 78 is determined by use of a measurement device 80. The computer will compute, from the flow rate of the gas in line 62, the temperature in the premix downcomer 64 and the flow rate of charge-stock in conduit 78, whether there is enough heat available to vaporize the charge-stock fed to contactor 8. If there is not, the computer 74 will reset the flow rate of charge-stock to the system to a lower rate. Upon loss of the hot, regenerated catalyst, the computer will shut off the feed valve 76. This is one of the features of this process system which will eliminate the possibility of coking of the system, which would result in a shutdown. This anticoking control could be replaced by a system to measure the density across premix downcomer 64 by differential pressure and using the density, along with the dispersion media rate in line 62 and the dispersed media temperature measured by temperature sensing element 72, to accomplish the same control.

Downstream of temperature sensing element 72, the charge stock supplied through line 78 is injected into the contactor 8 in intimate contact with the dispersed, hot regenerated catalyst. It is important that the charge-stock is atomized into the contactor so that to insure intimate contact of the charge-stock and regenerated catalyst so that the majority of the regenerated catalyst along with the fluidizing media supplied through line 62, and the vaporized feed are entrained through the horizontal contactor 8 into primary cyclone 66 of the separation system. This can be accomplished in many ways, but it is necessary that the feed be atomized horizontally into the contactor 10 into the falling curtain of catalyst particles described hereinafter. This allows for design of the system with multiple contactors 8 around a central horizontal feed distributor line 78 or multiple feed inlets 78 spaced around "top hat" 68 which is intermediate the top of stripper-heater 10 and the premix downcomer 64. In the former case, the feed distributor would be so designed to be located in the center of the top hat 68 so that the dispersed regenerated catalyst would surround the distributor and the feed would be atomized into the curtain of catalyst in a flat horizontal pattern at the same elevation as the horizontal contactor 8. The atomized oil velocity and resultant increased velocity due to vaporization and conversion of the oil will force the falling curtain of catalyst to turn 90 degrees and exit the top hat 68 through horizontal contactor 8 at 50 to 100 fps, thereby, conducting the total contacting in a horizontal phase. Some of the heavier particles of catalyst and some of those catalyst particles covered with asphaltenes will not exit stripper-heater 10 through horizontal contactor 8, but will fall to the top of the dense bed of spent and regenerated catalyst in the lower section of the stripper heater 10. In the case where there is only one horizontal contactor, the feed would be atomized and injected into the falling curtain of dispersed catalyst 180 degrees from the horizontal contactor charge-stock inlet. It is also possible to have the horizontal contactor 8 extend into the center of top hat 68 so that the entrance of the contactor is in center of the vessel. In this case, the charge-stock would be atomized and injected in a horizontal flat pattern around the periphery of the top hat 68 at the same elevation as the contactor 8.

The atomization and contacting can be accomplished many ways, but will be described by reference to a preferred design of a horizontal contactor 8 and an atomizing means 12. The horizontal contactor 8 comprises a substantially horizontal conduit connecting the "top-hat" portion 68 (i.e., the upper portion of stripper-heater 10 having a lesser diameter) of stripper heater 10 to the inlet of first stage cyclone 66 and positioned opposite charge-stock atomizer 12. The top hat 68 and horizontal contactor 8 provide a contacting zone wherein the atomized charge is intimately contacted with the hot regenerated catalyst. It is necessary that the atomized charge be introduced essentially horizontally into the top hat so as to pass through the falling curtain of hot regenerated catalyst particles into contactor 8. This allows for design of the system with multiple contactors 8 and even multiple charge injectors spaced around the catalyst inlet 86 of the contactor 8. The charge injection point is essentially at or slightly higher than the center of the horizontal contactor 8 inlet 86. The top hat 68 is employed in this design to decrease the catalyst-oil vapor contact time in this section and the regenerated catalyst will have a downward velocity of greater than 10 fps, and more preferably, greater than 20 fps. The vaporized charge plus the dispersion media and majority of the regenerated catalyst will immediately exit the top hat 68 of stripper-heater vessel 10 through contactor particle inlet 86 of the stripper-heater vessel 10 through horizontal contactor 8. In horizontal contactor 8 the velocity of the catalyst and vapors will be accelerated up to 50 to 100 fps, depending on the cyclones employed. The time in this contactor will typically be less than 0.1 second, as the length of this contactor only has to be sufficient to mechanically install primary cyclone 66. The heavier catalyst particles and any unvaporized charge material will settle by gravity into the top of stripper-heater 10 and will mix with other particles entering the stripper-heater 10.

As stated previously the proper design of the charge atomization means to form fluidizable particles and the design of the feed-hot circulating solids contacting is critical. A larger view of this system is shown in FIG. 2. To simplify the description, only one feed injector and one horizontal contactor will be described, but this should be in no way limiting, as those skilled in the art will know how to add more contactors 8 and charge injectors 12 for increased charging rates.

The type of charge atomizer 12 will depend to a great extent on the solids content of the charge-stock. However, the intent is to atomize the charge into droplets in the 1 to 10 micron particle size range. The charge stock can be atomized with water, steam, or gas; however, the preferred atomizing media is gas and preferably the same gas as used as the dispersion media. The pressure drop across the charge stock atomizer 8 will vary from 0.5 to 30 psi depending on the solids content of the feed and the desired droplet size and atomizing media. The higher the solids content the lower the pressure drop to reduce erosion.

The preferred atomizing means includes an injector having a nozzle for producing a flat horizontal pattern, a conduit for connection to a source of gaseous atomizing media supplied under pressure to the injector and a conduit for supplying charge stock to the injector.

As shown in FIG. 2, the charge is combined with gaseous atomizing media from conduit 88, which is connected to dispersion media conduit 62, in feed injector 12, which is a removable/adjustable burner assembly similar to the one typically used for injecting torch oil into a FCC regenerator. The tip of the nozzle on feed injector 12 will give a horizontal flat fan-shaped pattern covering an angle approximately equal to the width of the below-described falling curtain of hot regenerated catalyst minus about 10 to 20 degrees, so as to be certain to only contact hot catalyst.

Within the contacting zone 84 and contactor 8 the desired conditions are suitably maintained so that the charge-stock is cracked in the presence of the catalyst to lighter products. Typically, the cracking reaction will be carried out at a temperature between about 900° F. and about 1100° F., and the pressure will be between about 10 and about 50 psia. The catalyst to oil ratio will be maintained between about 2 and about 10, and the oil-catalyst contact time will be between about 0.1 and about 0.5 second.

The hot regenerated catalyst passing through control valve 54 is combined with the gaseous dispersion media from conduit 62 in premix downcomer 64. Downstream of the mixing point of these two materials in the premix downcomer 64, dispersion grid 90 in the regenerated catalyst inlet at the top of the "top hat" portion 68 of stripper-heater 10 channels the total hot, regenerated catalyst into a flat vertical pattern 92, which will traverse the flat horizontal pattern 94 of the atomized charge at approximately 90 degrees. Thus, there is provided a means for introducing the hot regenerated catalyst and dispersion media into the contacting zone which includes the premix downcomer 64 and dispersion grid 90. The dispersion media will actually act to propel the hot catalyst particles 89 through dispersion grid 90 with a resultant velocity of less than 40 fps in top hat 68, as discussed previously. The result of mixing these streams in the contacting zone 84 will be like an explosion as the feed increases in volume because of the vaporization and cracking reaction. This explosion will result in an acceleration of catalyst particles mainly through particle inlet 86 into the horizontal contactor 8, as this is the only way for the vapors to escape. However, some of the non-vaporized charge, which will mainly be asphaltene molecules under-going cracking, will form new particles, deposit on the hot circulating catalyst, or deposit on the solids in the feed. The heavier particles that are not entrained into the horizontal contactor 8 will settle out onto the top of the particulate bed 70 in stripper-heater 10. FIG. 2 depicts by dotted lines the assumed path of the feed and catalyst through the contactor into the inlet to the separator means. If there is more than one feed point and/or more than one contactor, the dispersion grid 90 can be designed to distribute the catalyst in another pattern to insure intimate contact of feed and catalyst.

It is important to note that if the molar rate of dispersion media is the same as the molar rate of the charge vapors after vaporization and reaction, then the resultant velocity of the two in top hat 68 will be twice the velocity of only the dispersion media. In this case, it would be less than 80 fps or the same as the inlet velocity of cyclone 66. Therefore, one can obtain lower contactor times in this type of apparatus compared to those systems known in the art and using similar equipment. In a 50,000 bpd system, the top hat 68 and horizontal contactor 8 would be about 45 inches in diameter. The stripper-heater 10 diameter would be about 8 feet. If it is assumed that the cyclone 66 inlet can be placed right outside the wall of the stripper-heater vessel 10, then the total length of the contactor 8 from the center of top hat 68 is the radius of stripper-heater 10, or 4 feet. At 80 fps the contactor time would be 0.05 seconds. This is ultra-short compared to what is known in the art. Times this short are impossible in the verticle, folded, or downflow riser contactors/reactors previously discussed in the art.

As discussed previously, the contact time can be increased significantly by increasing the dispersion media flow (top hat velocity increase). Another method is to inject the feed downwardly into the stripper-heater 10 with the hot catalyst surrounding the feed injector. Of course, the length of horizontal contactor 8 can be increased to increase the contact time.

Compared to either an upflow or downflow vertical riser, the present system has the distinct advantage of a feed injection system that eliminates the possibility of coking problems in the system. A confined riser is plagued with coking problems because of poor feed and hot catalyst distribution, which results from erratic media circulation, insufficient media circulation to vaporize the feed, rapid feed rate changes, or plugged feed injectors, which results in liquid feed contacting the confining walls of the riser or feed injector sides and forming coke. Once the coke forms it continues to grow until the refiner is forced to shutdown the unit. The horizontal contactor is employed in the present invention not only to minimize the contact time relative to that in a vertical riser, but also to eliminate the coking problems. If override control 72 does not function, the system will continue to operate, since the feed injected into the top hat 68 of stripper-heater 10 will flow downwardly countercurrently to the vapors from the bed, which will vaporize the lighter material in the feed. The remaining unvaporized hydrocarbon, which will be the majority of the heavy carbonaceous material in the feed, will be dispersed on top of the particulate level (bed) 70 in stripper-heater 10, which will be hot enough to vaporize the feed, since slide valve 52 will open to control the level in dipleg degassing vessel 34, and add the same amount of vaporizing media to the bed level in stripper heater 10 as was added to the upper section before losing the hot catalyst flow.

The temperature of the charge-stock in conduit 78 is typically above 400° F., and more preferably above 500° F., the charge-stock can be dispersed/atomized with steam, gas, water or by viscosity/differential pressure control across the feed injector 12. The hot regenerated catalyst, along with the dispersion media, contacts the feed and vaporizes the 1000° F. minus and thermally stable molecules boiling above 1000° F. in the hydrocarbon feed. The heavy, thermally unstable molecules boiling above 1000° F. thermally convert to lighter hydrocarbons, and the high molecular weight/high boiling asphaltene molecules form carbonaceous particles or deposits on the particles of catalyst and decompose into a low hydrogen solid carbonaceous material and a lighter hydrocarbon product. The hydrocarbon vapors are converted mainly catalytically. The vapors and the entrained catalyst particles exit horizontal contactor 8 and enter a primary separation zone, primary cyclone 66, where 90%+ of the entrained solids are separated from the hydrocarbon vapors and dispersion media. The spent catalyst removed in cyclone 66 is returned to stripper-heater 10 by dipleg 100 below the dense bed catalyst level to seal the dipleg.

The vapors and less than 10% of the spent catalyst now exit cyclone 66 and are mixed with hot regenerated catalyst from slide valve 96 and passed to a secondary separation zone, cyclone 60. Sufficient hot, regenerated catalyst should be added to increase the vapor temperature at least 5 degrees F. to prevent coking in high efficiency cyclone 60, which removes all the particles greater than 10 microns and returns them to stripper-heater 10 through dipleg 98 below the top of the dense bed catalyst level 70 in order to seal the dipleg 98. If desired, additional hot regenerated catalyst can be added to these vapors through slide valve 96 to increase the conversion level and selectivity on residual oil operations, where one might wish to operate the initial contactor 8 at a lower temperature to minimize thermal reactions. In this case, slide valve 54 would be controlled by a temperature control point in the outlet of primary cyclone 66 and slide valve 96 controlled by temperature controller 58.

High efficiency cyclone 60 is matched for efficiency with regenerator secondary cyclone so that catalyst losses from each system are balanced. In other words, there is not a preferential side to lose catalyst. The essentially catalyst free hydrocarbon vapors now exit high efficiency cyclone 60 and flow past temperature controller 58, which controls the contactor vapor temperature by resetting the regenerated catalyst flow through slide valve 54. The vapors then enter a main fractionator column (not shown) where they are quenched (desuperheated) and fractionated into products to be recovered. The main fractionator column products are typically a heavy bottoms product, a diesel boiling range material, unstabilized gasoline, and gas. Preferably, a portion of this gas stream is used as the dispersion media supplied by line 62. The gas product plus the unstabilized gasoline is normally processed in a gas concentration unit and separated into a dry gas product, a portion of which could be used as dispersion media and products of LPG and gasoline.

The spent catalyst entering stripper-heater 10 through diplegs 98 and 100 is mixed with hot regenerated catalyst from slide valve 52 in a dense bed stripping section. Steam stripping media is injected into the bottom portion of stripper-heater 10 through line 101 and a steam distributor 102 to aid in stripping entrained hydrocarbons from the spent catalyst. After stripping, the mixture of spent and regenerated catalyst exits stripper-heater 10 through slide valve 14 to continue the circuit as described above.

The system described above has the advantage that this system eliminates backmixing of catalyst which is very important. Backmixing of catalyst results in colder and lower activity catalyst, because of the carbon level covering the active sites, contacting the feed. Elimination of backmixing results in lower coke formation on the catalyst, which results in lower regenerator temperatures and higher catalyst to oil ratios. This results in a more selective or catalytic reaction, and therefore, a more desirable yield structure.

Other advantages of the present process are:

The system of the present invention employs a downward vaporizing-dispersion media flow followed by an essentially horizontal feed injection and horizontal contactor. This eliminates coking and results in much shorter contact times between the vaporized charge and the hot solid particles than can be accomplished in known systems. Not counting contact time in the cyclone section, which can be as high as 0.5 seconds, this system times of from about 0.1 to about 0.2 seconds.

The present system employs a stripper-heater for minimizing hydrocarbon product entrainment into the regenerator, and also for increasing the contactor catalyst temperature to decrease the time necessary for combustion.

The regenerator is a completely fluidized system with flue gas recycle to maintain the desired velocity in the combustor.

The use of a flue gas cooler between the primary and secondary cyclones on the regenerator.

The use of a dipleg degassing vessel as a stripper to reduce gas carryover to the horizontal contactor.

Injecting the hot regenerated catalyst particles into the stripper-heater at the top of the particulate level therein to increase the temperature of the vapors leaving the particulate bed in the stripper-heater to eliminate coking which might result from contacting cooler stripping vapors with heavy hydrocarbon vapors.

In the system described above, it is also possible to process multiple charge stocks, e.g., an additional separate charge-stock, which could be vacuum column residual oil, visbreaker or coker or selective vaporization or any thermal naphthas for octane improvement, virgin napthas, or any hydrocarbon feedstock that would benefit from separate and distinct severity levels using the circulating catalyst/material employed in the system. Because of the simplicity of design, the system shown in FIG. 3 could have many separate feeds, as well as individual contactors and cyclone separation systems for each feed system. Also, with residual oil charge stock, one might wish to inject the feed directly onto the top of the stripper-heater 10 bed level near the inlet of the hot regenerated catalyst from slide valve 52 to obtain a very severe cracking, both thermal and catalytic. This system is also applicable to multiple feed operation on all types of catalyst and circulating materials, such as those used in selective vaporization.

Figure 3:
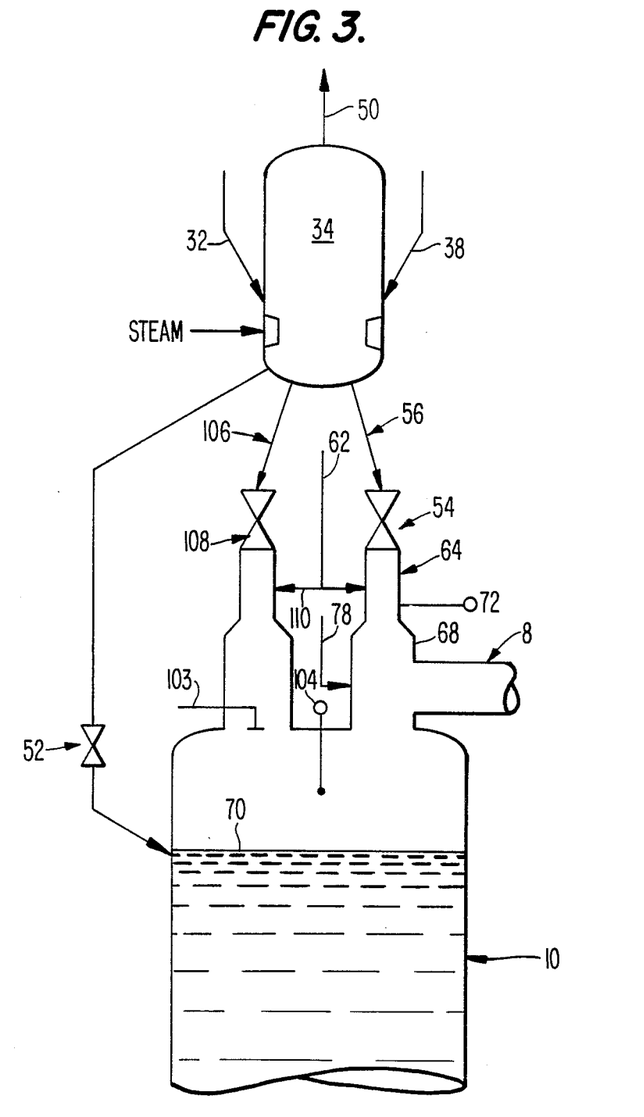
FIG. 3 is an enlarged partial view of a modification of the system of FIG. 1 showing an alternative arrangement for charging multiple charge-stocks to the system

For purposes of describing the process system shown in FIG. 3, it will be assumed that the primary feedstock supplied by line 78 is gas oil feed and the secondary feedstock supplied through line 103 is a vacuum column bottoms, or a residual oil feed. This in no way is intended to limit the process. The operation of the gas oil feed section is identical to that previously described. However, in this latter case, the residual oil feed is processed separately to allow for a different severity operation, as measured by a thermocouple in temperature controller 104, and to segregate the effects of basic nitrogen, which is normally concentrated in the residual oil and a temporary catalyst poison, and asphaltene deposits, which mask the active sites of the catalyst and lower the active site density, from interfering with the gas oil cracking. This system also allows for stabilization of the products of thermal cracking, which occur when processing residual oil, as the vapors from the residual oil cracking section exit the stripper-heater 10 through contactor 8 with the gas oil vapors and the catalyst. The gas oil vapors and the hydrogen transfer characteristics of the catalyst in this section will stabilize the product vapors from the residual oil.

If it is assumed the system is operating as described previously for a single charge-stock and, referring to both FIGS. 2 and 3, the operation of the system described. Hot reqenerated catalyst flows down standpipe 106 from regenerator cyclone dipleg degasser 34 and through slide valve 108, which is on temperature control from temperature controller 104 located in a section of stripper-heater 10 that will be responsive to the temperature of the vapors from this feed section. Downstream of slide valve 108, the regenerated catalyst is mixed with dispersion and propelling media supplied by conduit 110, which is normally the same as the dispersion media supplied by line 62 used in the primary feed system. This latter propelling media will normally operate at greater than 40 fps to propel the catalyst into stripper-heater 10 at such a rate as to minimize the entrainment of this catalyst with the vapors resulting from the atomization/injection of the secondary residual feedstock into the falling curtain of regenerated catalyst. The majority of the now spent catalyst will settle onto the top of the dense bed of spent catalyst in stripper-heater 10 where it will mix with hot regenerated catalyst from valve 52. The vapors from the reaction and vaporization of the residual oil containing some of the spent catalyst as entrainment will now combine with the products and catalyst from the gas oil (primary feed) feed section and enter horizontal contactor 8. As the reactions progress in horizontal contactor the secondary feed vapors will be further converted and stabilized. The total vapors and catalyst from horizontal contactor 8 will be separated as described previously. This secondary feed system could also be connected to either of the anti-coking computer systems previously described.

In my co-pending application for United States Letters Patent Ser. No. 116,886, filed Nov. 5, 1987 and entitled "Liquid-Solid Separation Process and Apparatus," I have disclosed a method upgrading heavy, liquid hydrocarbon charge-stocks contaminated with solids or solid forming contaminants to facilitate further processing of such charge-stocks, for example, in an FCC unit. The charge-stocks contemplated therein include atmospheric and vacuum residual oils, tar sand bitumens and like heavy oils containing coke precursors, metals, inorganic solids, etc. This process disclosed therein resembles the process of the present invention in that it employs a charge-stock atomized and injected horizontally into a falling curtain of hot circulating solid particles in a horizontal contactor to vaporize the charge stock, but wherein the finely divided fluidized, circulating particles are derived solely from the contaminants in charge-stock. This latter system can be used to prepare the charge-stock for the FCC process of the present invention and the two systems can be combined and employed advantageously in a two-stage process.

In such a two-stage process, the contactor vapors from the first stage (the liquid-solid separation process) after separation of the vaporized hydrocarbons and circulating solids, may be directly injected into the contactor 8 of the second stage (the FCC system described herein). The vapors from the first stage contactor are mixed with hot regenerated catalyst in the short contact time horizontal contactor using the same apparatus and circulating high zeolite content cracking catalyst as described hereinbefore. The principal difference is that the feed to the second stage is in the vapor form rather than being a liquid. However, there is also the option of a liquid feed, which could be either a virgin gas oil feed or a recycle hydrocarbon stream. Addition of such a liquid at this point is one method of increasing the catalyst to oil ratio.

For simplicity, the system operations are as previously described, but could be modified slightly, if desired. Since the first stage vapors already contain a gas diluent, and the mixing of vapors and catalyst are not as critical as the mixing of liquid and catalyst, one could dispense with the dispersion media supplied by conduit 62. In this case, the hot regenerated catalyst would just fall by gravity into the first stage vapors and be propelled into horizontal contactor 8. All other operations would essentially be the same as described above.

Also, one could eliminate the top hat 68 of the second stage. In this design, the first stage vapor inlet would be into the top section of stripper-heater 10, with the horizontal contactor outlet at the same elevation, but 180 degrees from the vapor inlet. For the first stage, vapors to reach the horizontal contactor 8 inlet, the vapors would contact the falling curtain of hot regenerated catalyst, and entrain the catalyst into the inlet of horizontal contactor 8. Both the vapor inlet and horizontal contactor 8 pipes could be extended into the stripper-heater 10 vessel to reduce the contact time.

It is necessary to use high activity (high zeolite content) catalyst since the feed is injected into the second stage contactor as a vapor at close to contactor temperature. This results in lower catalyst to oil ratios, since in this case, the only heat supplied by the catalyst must be for the heat of reaction and heat losses. Therefore, the catalyst to oil ratio in this case is less than one half and closer to one third of that of conventional FCC operations. An FCC operates in heat balance. This is the amount of heat supplied to the reactor (contactor) by the regenerated catalyst, and therefore, the amount of coke burned, is only that necessary to raise all of the materials injected into the reactor from inlet conditions to the reactor outlet conditions plus supply the heat of reaction (endothermic) and any heat losses. In a typical FCC operation with feed below its bubble point and a reactor temperature around 950 degrees F. it takes about 300 to 500 btu/# to raise the feed to reactor conditions. The heat of reaction is usually between 125 to 250 btu/# with negligible heat losses. This results in a catalyst to oil ratio of between 5 and 8 depending on the conversion and feedstock and regenerator type. In this two stage system, the total feed enters the reactor (contactor) at reactor conditions as a complete vapor. This then reduces the heat required in the reactor by 300 to 500 btu/# feed, and therefore, the catalyst to oil ratio by an equivalent amount. This reduction of catalyst to oil then forces one to operate the system with much higher activity (high zeolite content) catalyst than used in conventional systems in order to have the active site density in the reactor necessary for high conversion operations.

Having described the principals and preferred embodiments of the present invention, it should be recognized that modifications and variations thereof falling within the scope of the appended claims will become apparent to one skilled in the art.

What is claimed is:

1. A fluidized process for the conversion of a hydrocarbon oil charge stock to lower molecular weight liquid product comprising:
    (a) atomizing a primary charge-stock to provide a stream of liquid particles of a preselected size;
    (b) introducing said atomized primary charge-stock substantially horizontally into a primary reaction zone;
    (c) introducing a stream of hot fluidized cracking catalyst particles mixed with gaseous dispersion media downwardly into said reaction zone at a velocity greater than 10 feet per second to intimately contact said atomized primary charge-stock therein, the temperature, pressure and contact time with said atomized primary charge-stock being sufficient to vaporize hydrocarbons in said charge-stock and to crack the hydrocarbons to lower molecular weight product;
    (d) vaporizing a substantial portion of said hydrocarbons to form a mixture of said catalyst particles in the resulting vaporized hydrocarbons and cracking said vaporized hydrocarbons in said reaction zone to form cracked product vapors and spent catalyst;
    (e) rapidly passing a mixture of the resulting cracked product vapors, said media and a majority of said spent catalyst particles substantially horizontally through said reaction zone and into a reactor separation zone to provided a hydrocarbon/catalyst contact time prior to passage into said separation zone of not greater than 0.5 second and separating spent catalyst particles from said cracked product, said spent catalyst particles containing deposit of carbonaceous material thereon which reduce the cracking activity of said catalyst;
    (f) passing said spent catalyst particles to a combustion zone;
    (g) contacting said spent catalyst with an oxygen-containing gas in said combustion zone to burn said carbonaceous deposits and to provide a regenerated catalyst and a flue gas;
    (h) recycling the resulting hot, regenerated catalyst to said reaction zone to contact fresh atomized charge-stock; and
    (i) recovering a hydrocarbon product having a molecular weight lower than said charge stock.

2. The process of claim 1, wherein said catalyst is fresh catalyst containing at least 40% by weight of a zeolitic component having substantial cracking activity.

3. The process of claim 1, wherein said primary charge-stock is selected from the group consisting of residual oil, gas oil and tar sand bitumen.

4. The process of claim 1, wherein said flue gas is mixed with an oxygen-containing gas to provide a fluidizing media, said fluidizing media is introduced into the said combustion zone near the bottom thereof to fluidize the catalyst particles therein and oxidize said carbonaceous deposits, and wherein the flow rate and oxygen content of said fluidizing media supplied to said combustion zone are controlled in response to a signal representative of the amount of oxygen in said flue gas to obtain the desired amount of burning in said combustion zone.

5. The process of claim 4, wherein said combustion zone has an upper section and a lower section, the diameter of said lower section being greater than that of said upper section, and the velocity of said fluidizing media and spent catalyst particles in said lower section is less than the velocity thereof in said upper section.

6. The process of claim 1, wherein said cracked product is passed to a product fractionation zone, hydrocarbon gas from said fractionation zone is mixed with said hot, regenerated catalyst, the resulting mixture is introduced into said primary reaction zone and wherein the flow rate of said hydrocarbon gas is adjusted to control the contact time of said catalyst with said hydrocarbons in said primary reaction zone.

7. The process of claim 6, wherein the temperature and flow rate of said mixture of hydrocarbon gas and regenerated catalyst introduced into said primary reaction zone are measured, the flow rate of said charge-stock introduced into said primary reaction zone is measured, the amount of heat required to vaporize and crack hydrocarbons in said charge-stock is determined relative to the amount of heat in said mixture and the flow rate of said charge-stock is adjusted in response to said determined amount of heat.

8. The process of claim 1, wherein said spent catalyst is passed to a stripping zone and hydrocarbons are stripped therefrom prior to passing the spent catalyst to said combustion zone.

9. The process of claim 8, wherein a portion of said hot, regenerated catalyst is passed to said stripping zone to increase the temperature therein.

10. The process of claim 1, wherein said mixture of cracked product vapors and entrained spent catalyst particles are separated in at least a primary reactor separation zone and a secondary reactor separation zone, and a portion of said hot, regenerated catalyst is added to the cracked product vapors between said primary and secondary separation zones to increase the temperature of said cracked product vapors prior to entry into said secondary separation zone.

11. The process of claim 10, wherein the increase in the temperature of said cracked product vapors is at least 5° F.

12. The process of claim 1, further including contacting at least a secondary charge stock requiring a different severity of operation than said primary charge-stock to produce the desired product with said catalyst.

13. The process of claim 12, wherein said primary charge stock is a gas-oil and said secondary charge-stock is a residual oil, said spent catalyst is passed to a stripping zone for stripping hydrocarbons therefrom, a catalyst bed level being maintained in said stripping zone, and said residual oil is atomized and injected onto the top of said bed level and into a stream of hot, regenerated catalyst particles introduced substantially vertically into a secondary reaction zone located apart from said primary reaction zone.

14. The process of claim 8, wherein said hot fluidized cracking catalyst particles are introduced downwardly into said reaction zone, said stripping zone is positioned below said reaction zone, a portion of said spent catalyst particles drop from said reaction zone into said stripping zone, and spent catalyst particles are passed from said stripping zone into said combustion zone.

15. A fluidized process for the conversion of a hydrocarbon oil charge-stock to lower molecular weight liquid product comprising:
   (a) introducing a hydrocarbon oil charge-stock into a reaction zone;
   (b) introducing a mixture of hot fluidized particles of a cracking catalyst containing at least 40% by weight of a zeolitic component having a substantial cracking activity mixed with a gaseous dispersion media into said reaction zone in a first downward direction and at a velocity greater than 10 feet per second to intimately contact said charge-stock therein, the temperature, pressure and contact time with said primary charge-stock in said reaction zone being sufficient to vaporize hydrocarbons in said charge-stock and to crack the hydrocarbons to lower molecular weight cracked product;
   (c) vaporizing a substantial portion of said hydrocarbons to form a mixture of said catalyst particles in the resulting vaporized hydrocarbons and cracking said vaporized hydrocarbons in said reaction zone to form cracked product vapors and spent catalyst;
   (d) rapidly passing a mixture of the resulting cracked product vapors, said media and a majority of said spent catalyst particles through said reaction zone in a second direction substantially transverse to said first direction and into a reactor separation zone and separating spent catalyst particles from said cracked product, the hydrocarbon/catalyst contact time in said reaction zone prior to passage into said separation zone being not greater than 0.5 second, while a portion of said spent catalyst particles settles into a catalyst stripping zone positioned below said reaction zone; and
   (e) recovering a hydrocarbon product having a molecular weight lower than said charge stock.

16. The process of claim 15, wherein said catalyst is fresh catalyst.

17. The process of claim 15, wherein said charge stock is introduced substantially horizontally into said reaction zone.

18. The process of claim 15, wherein said charge stock is atomized to provide a stream of liquid particles of a preselected size and the atomized charge stock is introduced into said reaction zone.

* * * * *

UNITED STATES PATENT AND TRADEMARK OFFICE
CERTIFICATE OF CORRECTION

PATENT NO. : 4,985,136
DATED : January 15, 1991
INVENTOR(S) : David B. Bartholic It is certified that error appears in the above-identified patent and that said Letters Patent is hereby corrected as shown below:

Claim 1, column 19, line 62, change "deposit" to --deposits--.

Claim 18, column 22, line 30, change "15" to --17--.

Signed and Sealed this

Ninth Day of June, 1992

Attest:

DOUGLAS B. COMER

Attesting Officer

Acting Commissioner of Patents and Trademarks